(12) United States Patent
Dodge et al.

(10) Patent No.: US 10,989,335 B2
(45) Date of Patent: Apr. 27, 2021

(54) SADDLE PIPE SUPPORT

(71) Applicant: HYDRA-ZORB, Auburn Hills, MI (US)

(72) Inventors: Robert Dodge, Birmingham, MI (US); Mark Schwager, Shelby Township, MI (US)

(73) Assignee: ZSI, Inc., Canton, MI (US)

( * ) Notice: Subject to any disclaimer, the term of this patent is extended or adjusted under 35 U.S.C. 154(b) by 250 days.

(21) Appl. No.: 16/089,812

(22) PCT Filed: Mar. 30, 2017

(86) PCT No.: PCT/US2017/024959
§ 371 (c)(1),
(2) Date: Sep. 28, 2018

(87) PCT Pub. No.: WO2017/173047
PCT Pub. Date: Oct. 5, 2017

(65) Prior Publication Data
US 2020/0300386 A1   Sep. 24, 2020

Related U.S. Application Data

(60) Provisional application No. 62/315,047, filed on Mar. 30, 2016, provisional application No. 62/379,286, filed on Aug. 25, 2016.

(51) Int. Cl.
*F16L 3/26* (2006.01)
*F16L 3/24* (2006.01)
*F16L 59/135* (2006.01)

(52) U.S. Cl.
CPC ............... *F16L 3/26* (2013.01); *F16L 3/243* (2019.08); *F16L 59/135* (2013.01)

(58) Field of Classification Search
CPC ... F16L 3/26; F16L 3/243; F16L 3/245; F16L 3/00; F16L 3/08; F16L 3/18; F16L 3/227; F16L 59/135; E21F 17/02
(Continued)

(56) References Cited

U.S. PATENT DOCUMENTS 3,370,815 A    2/1968  Opperthauser
3,778,537 A *  12/1973 Miller ................. H01Q 1/1228
                                                174/138 R
(Continued)

OTHER PUBLICATIONS

BRONCO Support For Insulated Lines (Hydra Zorb CO Jan. 27, 2017. Retrieved from the Internet on Jun. 1, 2017. URL: <https://www.youtube.com/watch?v=gfSKRLLcgKg>.
(Continued)

*Primary Examiner* — Nkeisha Smith
(74) *Attorney, Agent, or Firm* — Harness, Dickey & Pierce, P.L.C.

(57) ABSTRACT

A pipe support is coupled to an elongated channel for receiving and supporting a pipe. The channel includes a base and a pair of spaced apart sidewalls extending from the base to a top plate. A flange projects downwardly from each top plate towards the base and defines a slot therebetween. The pipe support includes a body portion extending axially between opposite ends and having an inner surface and an outer surface. The body portion includes a generally arcuate bottom floor and a pair of spaced apart sidewalls projecting generally upwardly from the bottom floor. A plurality of axially spaced apart channel clips project downwardly from the outer surface of the body portion opposite the side walls. The channel clips have a leg portion and an outwardly projecting barb portion wherein the channel clips extend through the slot in the channel and the barb portions engage the respective spaced apart flanges to operatively couple the pipe support to the channel.

17 Claims, 3 Drawing Sheets

(58) Field of Classification Search
USPC ..... 248/72, 73, 62, 75, 58, 57, 65, 61, 74.2, 248/69, 74.4, 56, 59, 60; 174/40 R, 84 C; 24/455, 545, 519, 520
See application file for complete search history.

(56) References Cited

U.S. PATENT DOCUMENTS

| | | | | |
|---|---|---|---|---|
| 4,017,046 | A * | 4/1977 | Hicks | F16L 3/16 |
| | | | | 248/55 |
| 4,061,299 | A | 12/1977 | Kurosaki | |
| 5,642,557 | A * | 7/1997 | Clews | E04B 2/7442 |
| | | | | 24/339 |
| 5,762,300 | A * | 6/1998 | Sorkin | E04C 5/10 |
| | | | | 248/72 |
| 6,105,216 | A | 8/2000 | Opperthauser | |
| 6,224,025 | B1 * | 5/2001 | Alvarez | F16L 3/243 |
| | | | | 248/58 |
| 6,592,082 | B1 * | 7/2003 | Fear | H02G 3/0456 |
| | | | | 248/68.1 |
| 6,663,054 | B2 * | 12/2003 | Robicheau | F16L 3/26 |
| | | | | 248/49 |
| 6,729,585 | B2 * | 5/2004 | Ogden | H02G 3/32 |
| | | | | 248/58 |
| 7,654,492 | B2 * | 2/2010 | Balderama | F16L 3/243 |
| | | | | 248/72 |
| 8,074,943 | B2 * | 12/2011 | Boudreau | F16L 3/221 |
| | | | | 248/58 |
| 9,671,046 | B2 * | 6/2017 | Whipple | F16L 3/233 |
| 10,294,675 | B2 * | 5/2019 | Langeveld | F16B 5/0685 |
| 2005/0258314 | A1 * | 11/2005 | Schilles | B60R 16/0215 |
| | | | | 248/74.1 |
| 2008/0265106 | A1 * | 10/2008 | Boudreau | F16L 3/26 |
| | | | | 248/72 |
| 2009/0294600 | A1 * | 12/2009 | Dodge | F16L 3/243 |
| | | | | 248/73 |
| 2010/0025548 | A1 | 2/2010 | Grivas et al. | |

OTHER PUBLICATIONS

European Search Report corresponding to European Application No. 177766334 dated Oct. 25, 2019, 9 pages.

International Search Report corresponding to International Application No. PCT/US2017/024959 dated Jun. 19, 2017, 12 pages.

* cited by examiner

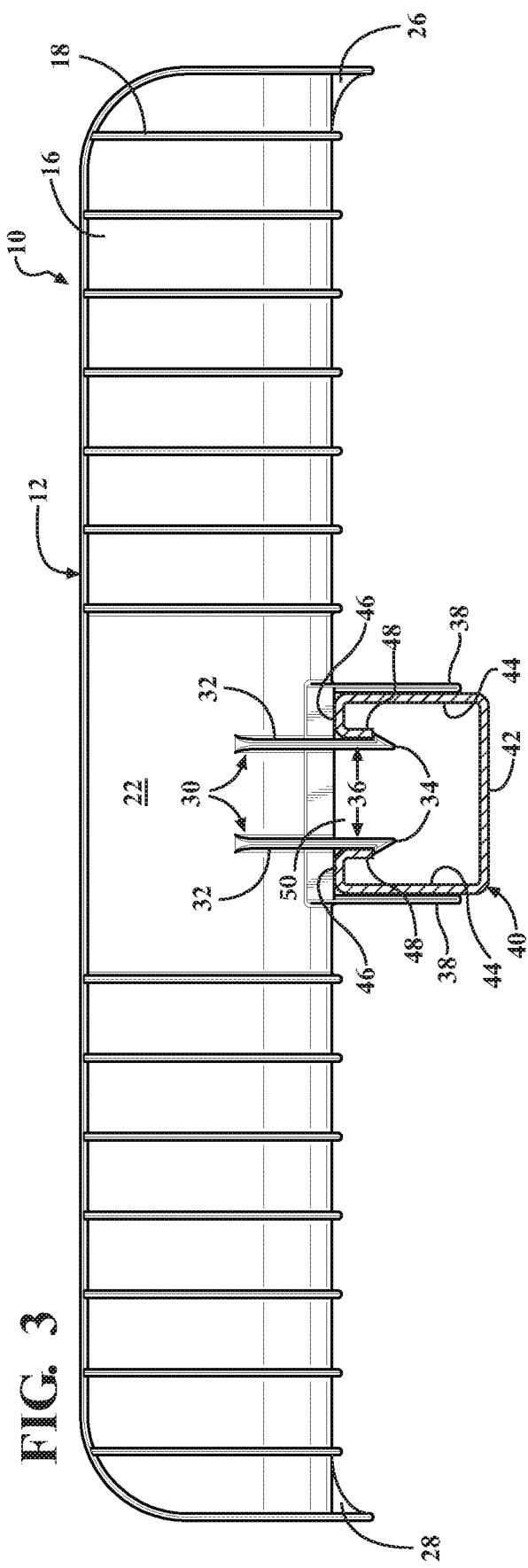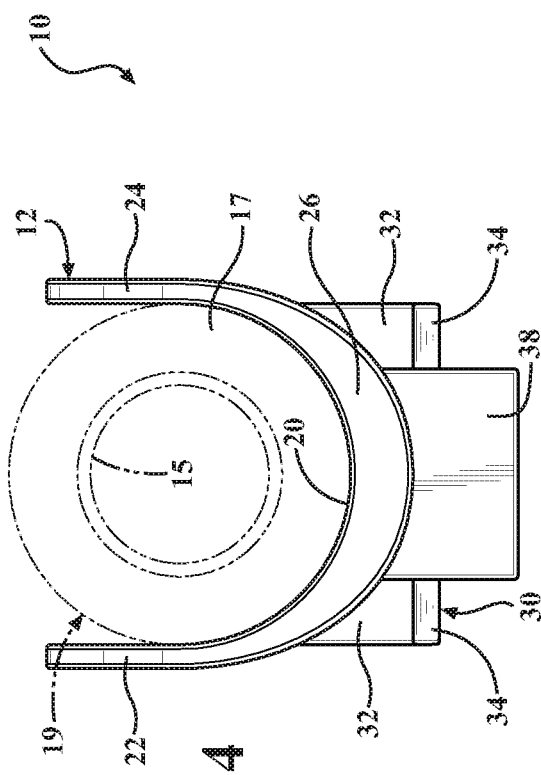

SADDLE PIPE SUPPORT

CROSS-REFERENCE TO RELATED APPLICATIONS

This application claims priority to and all the benefits of U.S. Provisional Application Nos. 62/315,047, filed on Mar. 30, 2016 and 62/379,286, filed on Aug. 25, 2016.

BACKGROUND OF THE INVENTION

1. Field of the Invention

The present invention relates to a pipe support. More particularly, the invention relates to a saddle pipe support adapted for connection to a channel for receiving and supporting a pipe.

2. Description of Related Art

Conventional pipes are used to convey or transfer fluids in various commercial and industrial application and buildings, such as water and sprinkler systems, refrigeration systems, and heating/cooling systems. The pipes are commonly encased in a cellular foam insulation tubing, which maintains the fluid within the pipes at a desired temperature. The pipe insulation tubing is commonly provided in predetermined lengths that are aligned end-to-end to cover an entire length of pipe.

In a typical application and installation, the insulated pipe, that is, the pipe encased by the insulation tubing, is disposed along a support structure, such as a ceiling of the building. The insulated pipe is commonly supported along the support structure be a plurality of spaced apart clevis hangers or straps. An elongated metal U-shaped channel is typically fixedly secured to the support structure or ceiling for supporting the clevis hangers. The clevis hanger typically includes an upper member mounted to the channel and a generally U-shaped lower member coupled to the upper member for supporting the insulated pipe spaced below the channel. The shape of the lower member complements that of the outer periphery of the insulated pipe, thereby allowing the clevis hanger to support and retain the insulated pipe along the channel. Examples of common clevis hangers for supporting insulated pipes are shown in U.S. Pat. Nos. 7,207,527 and 7,520,475.

It is also known to provide a saddle shaped pipe support adapted to be connected to the U-shaped channel and shaped complementary to the insulated pipe to support a longitudinal length of the insulated pipe. The saddle pipe support includes a body portion having a curved bottom and arcuate upwardly extending walls for receiving and supporting the insulated pipe. A pair of spaced apart members having inwardly extending hooks or barbs extend downwardly from the body portion for receiving the outer walls of the channel therebetween to secure the saddle pipe support to the channel. A saddle pipe support known in the prior art is shown in U.S. Pat. No. 8,074,943.

However, it remains desirable to provide a more secure and stable connection between the saddle pipe support and the channel for supporting the insulated pipe.

SUMMARY OF THE INVENTION

A pipe support is provided for receiving and supporting a pipe. The pipe support comprises a body portion extending axially between opposite ends and having an inner surface and an outer surface. The body portion includes a generally arcuate bottom floor and a pair of spaced apart sidewalls projecting generally upwardly from the bottom floor. A plurality of axially spaced apart channel clips project downwardly from the outer surface of the body portion opposite the side walls. The channel clips comprise a leg portion and an outwardly projecting barb portion adapted for operatively coupling the pipe support to a support structure.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a side view of the saddle pipe support connected to a U-shaped channel; and FIG. 4 is an end view of the saddle pipe support.

DETAILED DESCRIPTION OF THE EMBODIMENTS

Figure 1:
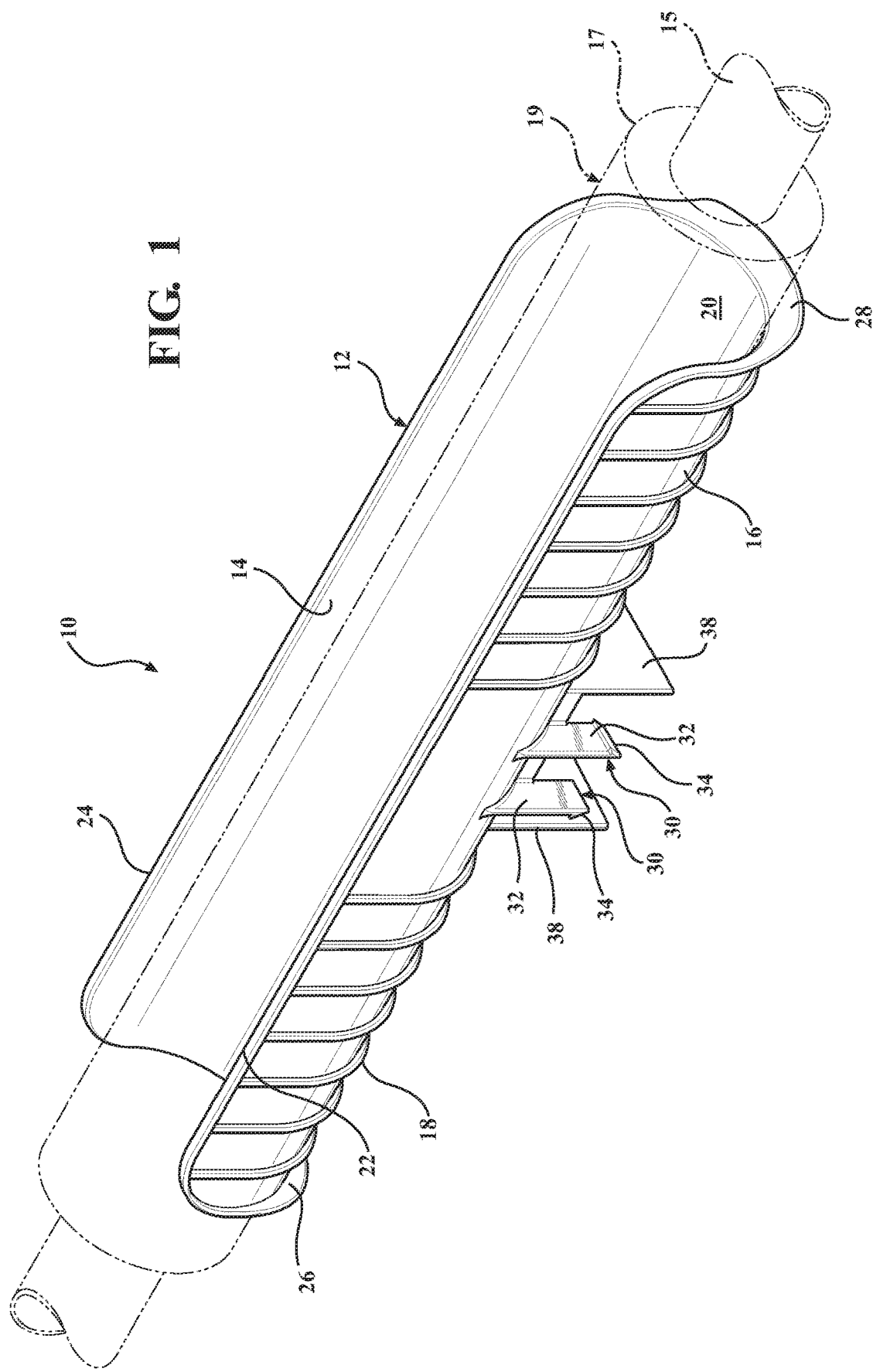
FIG. 1 is a top perspective view of the saddle pipe support according to one embodiment of the invention supporting an insulated pipe.
Figure 2:
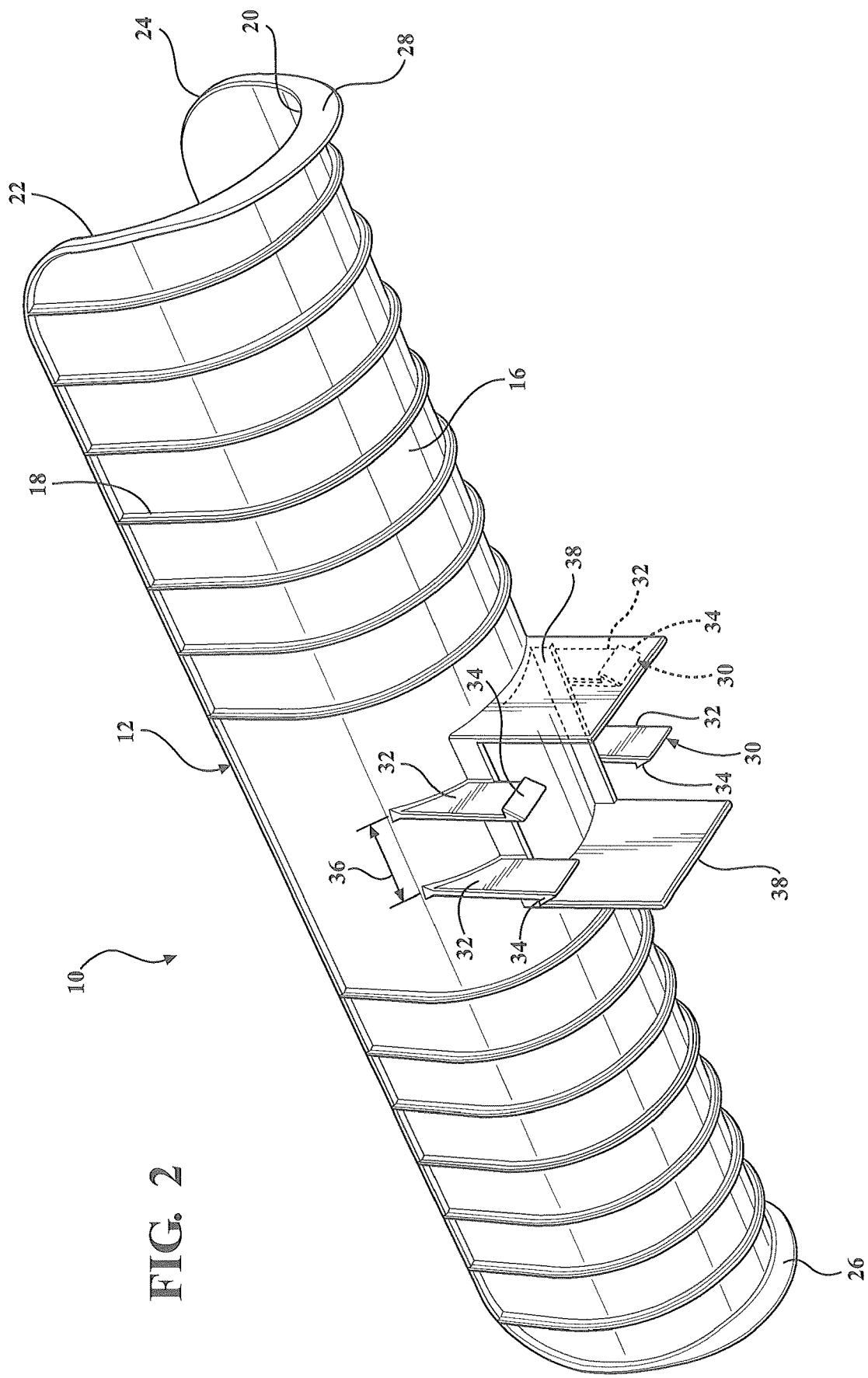
FIG. 2 is a bottom perspective view of the saddle pipe support.

Referring to the Figures, wherein like numerals indicate like or corresponding parts throughout the several views, a saddle pipe support 10, preferably fabricated by molded plastic is shown in FIG. 1, for supporting an elongated pipe 15. The pipe 15 is generally a fluid pipe used in commercial or industrial buildings for transferring fluid in water, refrigeration, or heating/cooling systems. Further, the pipe 15 is typically encased in a cellular foam insulation tubing 17 for maintaining the temperature of the fluid in the pipe 15, collectively referred to herein as an insulated pipe and shown at 19.

The saddle pipe support 10 is adapted to be removeably coupled to a support structure commonly known as an elongated metal U-shaped channel 40 which is typically fixedly secured to a wall or ceiling of the building. The channel 40, which is commonly known in the art, includes a flat base 42 extending between a pair of spaced apart upright sidewalls 44. A top plate 46 projects inwardly from each of the respective sidewalls 44 and is generally parallel to the base 42. Each top plate 46 terminates with a downwardly turned flange 48 projecting toward but spaced above the base 42. An elongated slot 50 is defined between the spaced apart and opposite facing flanges 48.

The pipe support 10 includes an elongated semi-cylindrical or generally U-shaped body portion 12 having an inner support surface 14 for supporting the insulated pipe 19 and an outer surface 16 reinforced by a plurality of transverse structural ribs 18. More specifically, the body portion 12 includes an arcuate bottom floor 20 and a pair of spaced apart upwardly or vertically extending sidewalls 22, 24. The body portion 12 extends axially, or longitudinally, between opposite ends terminating with downwardly curved or tapered lips 26, 28 projecting from the bottom floor 20. The structural ribs 18 are spaced apart transverse to the axial length of the body portion 12 and extend around the outer surface 16 of the bottom floor 20 and each sidewall 22, 24 to provide structural rigidity and strength to the pipe support 10.

A plurality of spaced apart channel clips 30 project downwardly from the outer surface 16 of the body portion 12 for connection to the elongated channel 40, as shown in FIG. 3. More specifically, each channel clip 30 includes vertical leg portion 32 extending downwardly from the body portion 12 to an outwardly projecting distal barb portion 34 for engaging the edge of the opposing flanges 48 on the channel 40 to lockingly secure the saddle pipe support 10 to the channel 40. In the embodiment shown in FIGS. 1-4, the pipe support 10 includes a first pair of spaced apart channel clips 30 spaced laterally opposite a second pair of spaced apart channel clips 30 defining an axial gap 36 therebetween. However, it should be appreciated that the pipe support 10 may include a single pair of opposite facing and spaced apart channel clips 30 defining the axial gap 36 without varying from the scope of the invention.

Finally, the saddle pipe support 10 further includes a pair of spaced apart stabilizing flanges 38 projecting downwardly from the outer surface 16 of the body portion 12 adjacent and spaced parallel to the channel clips 30 for engaging the sidewalls 44 of the channel 40 to laterally support and stabilize the pipe support 10. As shown in the drawings, the channel clips 30 and stabilizing flanges 38 are arranged transverse to the longitudinal axis of the body portion 12 in order to align with the elongated channel 40.

In operation, the longitudinal axis of the saddle pipe support 10 is arranged transverse to the longitudinal axis of the channel 40 as shown in FIG. 3. The channel clips 30 are inserted downwardly through the slot 50 in the channel 40 defined between the flanges 48 until the barb portions 34 hook under the bottom edge of the flanges 48 locking the clips 30 into the channel 40. It should be appreciated that the outwardly projecting barb portions 34 may engage the side face of the flanges 48 and flex the clips 30 slightly inwardly until the barb portions 34 extend past the distal edge of the flange 48 to lock the clips 30 to the channel 40. Additionally, the sidewalls 44 of the channel 40 are received between the spaced apart stabilizing flanges 38 such that the stabilizing flanges 38 engage the outer surface of the sidewalls 44 and provide lateral stability to the saddle pipe support 10 along the channel 40. As shown in FIG. 3, when the pipe support 10 is coupled to the channel 40, the sidewalls 44 and top plate 46 of the channel 40 are seated in the space formed between the channel clips 30 and the stabilizing flanges 38. Once the saddle pipe support 10 is coupled to the channel 40, a length of insulated pipe 19 may be inserted between the sidewalls 22, 24 and supported by the bottom floor of the body portion 12. It should be appreciated that the saddle pipe support 10 is configured to receive and support a pipe 15 whether encased in the insulation tubing 17 or not. Also, the flared or downwardly curved lips 26, 28 on the opposite distal ends of the body portion 12 allow the insulated pipe 19 to be moved axially along the saddle pipe support 10 without damage to the insulation tubing 17.

If it desirable to disconnect the saddle pipe support 10 from the channel 40, the channel clips 30 may simply be flexed inwardly to release the barb portions 34 from engagement with the flanges 48 and allow the saddle pipe support 10 to be removed from the channel 40.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A pipe support adapted for receiving and supporting a pipe, the pipe support comprising:
   a body portion extending axially between opposite ends thereof and having an inner surface and an outer surface, the body portion including a generally arcuate bottom floor and a pair of spaced apart sidewalls projecting generally upwardly from the bottom floor;
   a plurality of axially spaced apart channel clips projecting downwardly from the outer surface of the body portion opposite the sidewalls, the channel clips comprising a leg portion and an outwardly projecting barb portion adapted for operatively coupling the pipe support to a support structure; and
   a pair of axially spaced apart stabilizing flanges projecting downwardly from the outer surface of the body portion and arranged parallel to and spaced axial from the channel clips.

2. The pipe support as set forth in claim 1 wherein the opposite ends of the body portion are defined by downwardly curved lips.

3. The pipe support as set forth in claim 2 further including a plurality of axially spaced apart structural ribs formed on the outer surface of the body portion along the bottom floor and the sidewalls.

4. The pipe support as set forth in claim 1 wherein the plurality of channel clips includes a first pair of channel clips and a second pair of channel clips laterally spaced apart from the first pair of channel clips.

5. The pipe support as set forth in claim 4 wherein the stabilizing flanges are disposed along a longitudinal axis of the body portion of the pipe support, and the first and second pairs of channel clips are disposed on opposite sides of the stabilizing flanges in a lateral direction of the body portion.

6. The pipe support as set forth in claim 1 wherein the stabilizing flanges are free of any barb portion.

7. In combination, a pipe support adapted to be operatively coupled to an elongated channel for receiving and supporting a pipe, wherein:
   the channel includes a base and a pair of spaced apart sidewalls extending from the base to a top plate, wherein a flange projects downwardly from each top plate towards the base and defines a slot therebetween;
   the pipe support includes:
   a body portion extending axially between opposite ends thereof and having an inner surface and an outer surface, the body portion including a generally arcuate bottom floor and a pair of spaced apart sidewalls projecting generally upwardly from the bottom floor;
   a plurality of axially spaced apart channel clips projecting downwardly from the outer surface of the body portion opposite the sidewalls of the body portion, the channel clips comprising a leg portion and an outwardly projecting barb portion wherein the channel clips extend through the slot in the channel and the barb portions engage the flanges on the channel to operatively couple the pipe support to the channel; and
   a pair of axially spaced apart stabilizing flanges projecting downwardly from the outer surface of the body portion and arranged parallel to and spaced axially from the channel clips for receiving the sidewalls of the channel therebetween to laterally support the pipe support.

8. The combination as set forth in claim 7 wherein the opposite ends of the body portion of the pipe support are defined by downwardly curved lips.

9. The combination as set forth in claim 8 wherein the pipe support further includes a plurality of axially spaced apart structural ribs formed on the outer surface of the body portion along the bottom floor and the sidewalls of the body portion.

10. The combination as set forth in claim 7 wherein the plurality of channel clips includes a first pair of channel clips and a second pair of channel clips laterally spaced apart from the first pair of channel clips.

11. The combination as set forth in claim 10 wherein the stabilizing flanges are disposed along a longitudinal axis of the body portion of the pipe support, and the first and second pairs of channel clips are disposed on opposite sides of the stabilizing flanges in a lateral direction of the body portion.

12. The combination as set forth in claim 7 wherein the stabilizing flanges are free of any barb portion.

13. A pipe support configured to be secured to a U-shaped channel including a base, a pair of sidewalls projecting from the base, a pair of top plates projecting from inner surfaces of the sidewalls toward one another, and flanges projecting from the top plates toward the base and defining a slot therebetween, the pipe support comprising:

an elongated main body having a concave inner surface configured to support a pipe and a convex outer surface opposite of the inner surface of the main body;

a first pair of channel clips projecting from the outer surface of the main body and spaced apart from one another in a longitudinal direction of the main body, each of the channel clips including a leg portion and a barb portion disposed at a distal end of the leg portion, wherein the barb portions of the channel clips are configured to engage the flanges on the U-shaped channel to secure the pipe support to the U-shaped channel; and a pair of stabilizing flanges projecting from the outer surface of the main body and spaced apart from one another in the longitudinal direction of the main body, wherein the stabilizing flanges are configured to engage outer surfaces of the sidewalls of the U-shaped channel to stabilize the pipe support relative to the U-shaped channel.

14. The pipe support as set forth in claim 13 wherein the channel clips and the stabilizing flanges are non-overlapping a lateral direction of the main body.

15. The pipe support as set forth in claim 13 further including a second pair of the channel clips projecting from the outer surface of the main body and spaced apart from one another in the longitudinal direction of the main body.

16. The pipe support as set forth in claim 15 wherein the stabilizing flanges are disposed along a longitudinal axis of the main body of the pipe support, and the first and second pairs of the channel clips are disposed on opposite sides of the stabilizing flanges in a lateral direction of the main body.

17. The pipe support as set forth in claim 13 wherein the stabilizing flanges are free of any barb portion.

\* \* \* \* \*